United States Patent
Marra et al.

(10) Patent No.: US 9,395,871 B2
(45) Date of Patent: Jul. 19, 2016

(54) DETECTION AND CONTROL OF MULTIMEDIA APPLICATIONS

(71) Applicant: Google Inc., Mountain View, CA (US)

(72) Inventors: Gregory Matthew Marra, San Francisco, CA (US); Gideon Wald, San Francisco, CA (US); Kathryn Cushing, San Francisco, CA (US); Thomas Christian Wiltzius, Santa Barbara, CA (US)

(73) Assignee: Google Inc., Mountain View, CA (US)

( * ) Notice: Subject to any disclaimer, the term of this patent is extended or adjusted under 35 U.S.C. 154(b) by 402 days.

(21) Appl. No.: 13/753,440

(22) Filed: Jan. 29, 2013

(65) Prior Publication Data

US 2015/0253936 A1  Sep. 10, 2015

(51) Int. Cl.
*G06F 3/16* (2006.01)
*G06F 3/0481* (2013.01)
*G06F 3/0482* (2013.01)
*G06F 3/0484* (2013.01)
*H04M 1/60* (2006.01)

(52) U.S. Cl.
CPC .......... *G06F 3/0481* (2013.01); *G06F 3/04847* (2013.01); *H04M 1/6016* (2013.01); *G06F 3/0482* (2013.01); *G06F 3/0484* (2013.01); *G06F 3/16* (2013.01); *G06F 3/162* (2013.01); *G06F 3/165* (2013.01)

(58) Field of Classification Search
CPC .......... G06F 3/16; G06F 3/162; G06F 3/165; G06F 3/0481; G06F 3/0482; G06F 3/0484
See application file for complete search history.

(56) References Cited

U.S. PATENT DOCUMENTS

| | | | |
|---|---|---|---|
| 7,571,014 B1 * | 8/2009 | Lambourne et al. | 700/94 |
| 2004/0102861 A1 * | 5/2004 | Han | 700/94 |
| 2004/0201608 A1 * | 10/2004 | Ma et al. | 345/719 |
| 2005/0043831 A1 * | 2/2005 | Baudisch | 700/94 |
| 2006/0210097 A1 * | 9/2006 | Yerrace et al. | 381/119 |
| 2006/0248557 A1 * | 11/2006 | Stark et al. | 725/37 |
| 2006/0285701 A1 * | 12/2006 | Chumbley et al. | 381/104 |
| 2007/0244586 A1 * | 10/2007 | Champion et al. | 700/94 |
| 2009/0182889 A1 * | 7/2009 | Hurst | H04N 21/4325 709/231 |
| 2010/0235765 A1 * | 9/2010 | Worthington | 715/760 |
| 2011/0113337 A1 * | 5/2011 | Liu et al. | 715/727 |
| 2011/0191677 A1 * | 8/2011 | Morris | 715/716 |
| 2012/0110452 A1 * | 5/2012 | Hiipakka et al. | 715/716 |
| 2012/0266071 A1 * | 10/2012 | Chen | 715/727 |
| 2013/0080955 A1 * | 3/2013 | Reimann et al. | 715/769 |
| 2014/0109003 A1 * | 4/2014 | Saib et al. | 715/808 |

OTHER PUBLICATIONS

Baudisch, Patrick et al., "Flat Volume Control: Improving Usability by Hiding the Volume Control Hierarchy in the User Interface," CHI 2004, pp. 255-262, 2004.*

(Continued)

*Primary Examiner* — Eric J Bycer
(74) *Attorney, Agent, or Firm* — McDermott Will & Emery LLP

(57) ABSTRACT

A mechanism for automatically detecting and controlling active multimedia applications is provided. Software is installed on a computing device that detects a plurality of active multimedia sources, and then determines that one or more of the plurality of active multimedia sources accept remote control of one or more multimedia features. A software multimedia user interface, including graphically displayed interactive volume controls for the detected multimedia sources, is displayed and configured to enable a user to remotely control the respective audio levels of each detected multimedia program by graphic manipulation of respective interactive volume controls.

24 Claims, 5 Drawing Sheets

(56) References Cited

OTHER PUBLICATIONS

Richards, T.N., "Audio Mixer and Master Volume Control with Automatic Configuration," IBM Technical Disclosure Bulletin, vol. 37, No. 1, pp. 485-486, Jan. 1, 1994, retrieved from IP.com on Feb. 22, 2015.*

Thomas, "Set individual Sound Volume for programs in Windows 7 [Quick Tip]," originally published on Nov. 25, 2011, at http://mintywhite.com/windows-7/set-individual-sound-volume-programs-windows-7, archived on Dec. 30, 2011, and retrieved from www.archive.org on Feb. 4, 2015, 3 pages.*

* cited by examiner

DETECTION AND CONTROL OF MULTIMEDIA APPLICATIONS

BACKGROUND

Computing devices may include multiple applications that provide audio transmission for human listening. Web sites provide audio/visual services, including music streaming, video streaming, and the like. A computing device may include integrated hardware or software for controlling a master volume for all audio sound originating from software applications running on the device. In other aspects, software may be configured to detect and control external audio devices. Since each software application or external device is independent of each other, a user wishing to select, or control volume for, a single application or device from multiple applications and/or devices must operate the respective controls individually.

SUMMARY

The subject technology provides a system and method for displaying a universal audio control. According to one aspect, a computer-implemented method may comprise initiating, at a computing device, a display of a graphic multimedia interface, determining, on initiating the display of the multimedia interface, a plurality of multimedia programs available to receive streaming multimedia content from respective remote audio sources, and providing the multimedia interface for display on a display screen associated with the computing device, the multimedia interface operating independent of the plurality of multimedia programs and including a plurality of graphically displayed interactive controls for controlling multimedia features of the plurality of multimedia programs.

In another aspect, a machine-readable medium may have instructions stored thereon that, when executed, cause a machine to perform a method for displaying a universal audio control. In this regard, the method may comprise detecting a plurality of multimedia programs that receive streaming multimedia content from an external location, determining that one or more of the plurality of multimedia programs accept remote control of one or more multimedia features, and providing a graphic multimedia interface for display on a computing device, including one or more graphically displayed interactive controls for each multimedia program determined to accept remote control of one or more multimedia features, the graphic multimedia interface configured to, on a user manipulation of an interactive control, remotely control a multimedia feature of a multimedia program associated with the manipulated interactive control. Other aspects include corresponding systems, apparatus, and computer program products. Other aspects include corresponding systems, apparatus, and computer program products.

In a further aspect, a system may include a display screen, one or more processors, and a memory. The memory may include server instructions thereon that, when executed, cause the one or more processors to initiate a display of a graphic multimedia interface, determine, on initiating the display of the graphic multimedia interface, a plurality of multimedia programs available to receive streaming multimedia content from respective remote audio sources, and provide the multimedia interface for display on the display screen, the multimedia interface operating independent of the plurality of multimedia programs and including one or more graphically displayed interactive controls for each determined multimedia program, an interactive control configured to remotely control a multimedia feature by graphic manipulation of the interactive control, receive a user-initiated manipulation of an interactive control corresponding to a multimedia program, and change a state of a multimedia feature for the corresponding multimedia program according to the user-initiated manipulation of the interactive control while keeping a current state of other multimedia features unchanged.

These and other aspects may provide one or more of the following advantages. The subject technology provides an easy to use control interface for controlling all active audio applications on a computing device. By providing the universal audio control of the subject technology, the user may more easily manipulate audio controls without having to search for and open individual applications. Accordingly, the user is saved cognitive resources measured in the effort and time that would otherwise be required to search for and open individual applications. Accordingly, the user has more time to perform other tasks or activities.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

A detailed description will be made with reference to the accompanying drawings.

DETAILED DESCRIPTION

Figure 1:
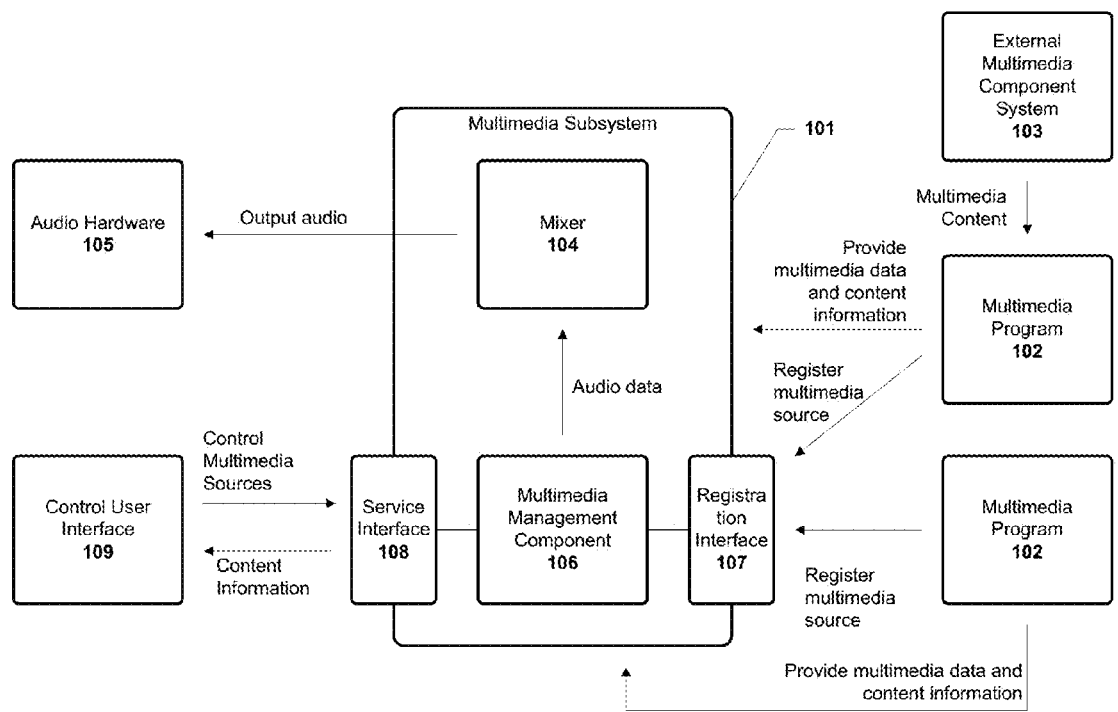
FIG. 1 depicts example components for automatic detection and control of multimedia applications.

FIG. 1 depicts example components for automatic detection and control of multimedia applications, according to one aspect of the subject technology. A computing device (for example, tablet computer, notebook or personal computer, PDA, a smartphone, server, or television or other display device with one or more computing devices embedded therein or attached thereto) is configured with a multimedia subsystem 101 for operating system level management of multimedia data and other signals produced by hardware components of the computing device, various multimedia programs 102 executing on the computing device, or one or more operably connected multimedia component systems 103.

Multimedia programs 102 are application programs that operate independent of multimedia subsystem 101. Multimedia programs 102 may include one or more native applications (for example, installed on the computing device) and/or one or more web applications (for example, accessed over a network or embedded within a web-page displayed by a browser). For example, a multimedia program 102 may include a user-facing multimedia application such as a stand-alone media player, internet-radio application, a website providing audio or video content in a web browser, a browser component providing audio or video content, or other types of software for streaming or receiving streamed audio or video. In some implementations, a multimedia program 102 may include a software program for receiving audio data from a multimedia component system 103. For example, multimedia program 102 may be software installed on a computing device for communication with an audio/video (A/V) receiver.

Multimedia subsystem 101 includes an audio mixer 104 for volume and tone control of audio signals generated by multimedia programs 102 for output to audio hardware 105 of the computing device. Multimedia subsystem 101 includes a multimedia management component 106 (for example, a software library) for more detailed mixing and management of multimedia data before audio data is passed through audio mixer 104 or converted to audible audio signals. As will be described further, management component 106 detects active multimedia programs 102, verifies the detected programs accept remote control of their respective audio levels, and aggregates control over those programs through a user interface.

In various aspects, multimedia management component 106 may provide a registration interface 107 (for example, part of a application programming interface (API) framework) to receive registration information requests from multimedia programs 102 executing on the computing device. A multimedia program 102 may be configured (for example, by way of programming) to, when executed or instructed to playback multimedia content, operably connect to registration interface 107 (for example, via the API) and register itself with multimedia management component 106. Once multimedia program 102 is registered, multimedia subsystem 101 may receive streaming multimedia content (for example, audio and/or video data) from multimedia program 102.

In other aspects, a multimedia program 102 may provide an indication to registration interface 107 (for example, a notification sent via the API) that multimedia program 102 is active and accepts remote control of features provided by multimedia program 102 (for example, audio levels). Multimedia program 102 may then periodically provide multimedia subsystem (for example, via registration interface 107) content information for actively playing or queued multimedia content. Content information may include, for example, a title or description associated with the multimedia content. By querying interface 107 for this information, management component 106 may determine content information for a multimedia source (for example, an internet radio provider) associated with multimedia program 102. In some implementations, each multimedia program 102 may register itself at registration interface 107, and multimedia management component 106, on learning of a registered audio source from the registration, may query the audio source directly for content information.

As described previously, multimedia management component 106 may determine active sources of multimedia content by detecting registration of multimedia programs 102 at registration interface 107. In some examples, management component 106 further determines that one or more active multimedia sources accept remote control of respective audio levels. Management component 106 may then send and receive messages to and from one or more multimedia programs 102 to control various aspects of multimedia programs 102, including increasing or decreasing volume of audio currently being streamed by corresponding multimedia sources, changing songs or stations, suspending/pausing, resuming or terminating playback, and the like. Management component 106 may send messages to a multimedia source 102 requesting, for example, various types of audio-related content information from the multimedia source (for example, title information, artist information, and the like).

In various aspects, management component 106 enumerates what multimedia programs 102 are providing audio and provides them to a multimedia service interface 108. Multimedia service interface 108 provides a service-level interface (for example, another part of the API framework) for providing user control over the enumerated multimedia programs 102. Accordingly, the subject technology provides a software control user interface (UI) 109, which may be graphically displayed to a user in the form of a dialogue box or similar graphic user interface for remote user-control over enumerated multimedia programs 102. In this respect, control UI 109 includes graphically displayed interactive volume controls for each of the enumerated multimedia programs 102, and is configured to remotely control the respective audio levels by graphic manipulation of respective interactive volume controls. As will be described further, control UI 109 may further display content information received from one or more enumerated audio programs.

Multimedia subsystem 101 may receive streaming multimedia content from a detected multimedia program 102, the audio program receiving the streaming multimedia content from a multimedia component system 103 located remote from the computing device. Management component 106 may receive from control UI 109 a query for multimedia programs 102 that accept remote control of one or more multimedia features, return a list of programs, and then receive from control UI 109 one or more commands to control one or more features of multimedia component system 103. On receiving the one or more commands, management component 106 remotely controls, via the detected multimedia program 102, the one or more features of the multimedia component system 103 according to the received one or more commands.

Figure 2A:
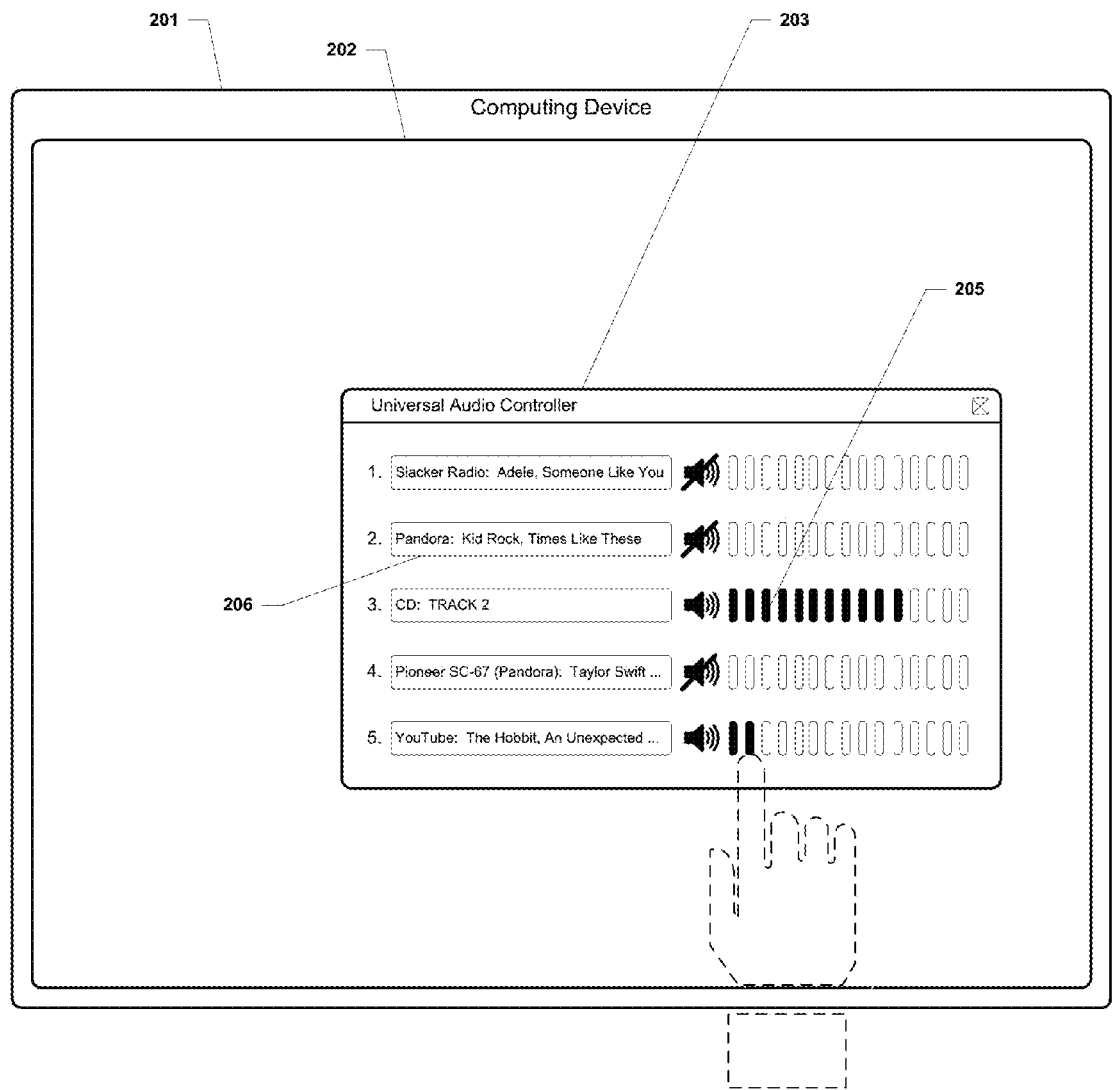
FIGS. 2A and 2B depict diagrams of an example computing device, including a universal multimedia control displayed on a display screen for manipulation of multiple active multimedia sources.
Figure 2B:
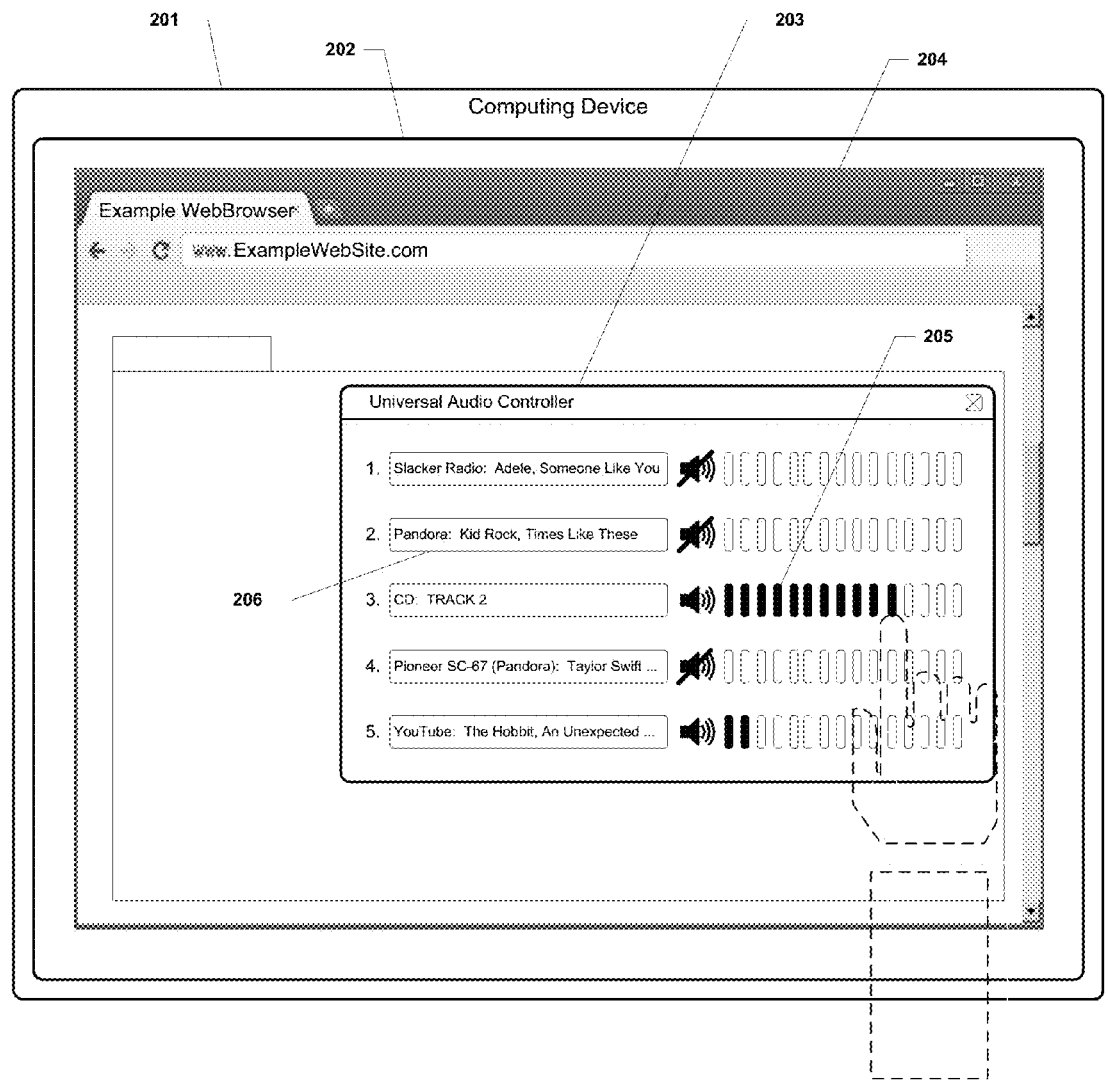

FIGS. 2A and 2B depict diagrams of an example computing device, including a universal multimedia control displayed on a display screen for manipulation of multiple active multimedia sources, according to one aspect of the subject technology. A computing device 201 (for example, tablet computer, notebook or personal computer, PDA, a smartphone, GPS navigation device, or television or other display device with one or more computing devices embedded therein or attached thereto) is configured with program code for generating and displaying, on a touch-sensitive display screen 202, a virtual multimedia controller 203. According to the example of FIG. 2A, virtual multimedia controller 103 may be a stand-alone user interface that may be executed independently of other programs. Multimedia controller 203 may be graphically displayed as layered over at least a portion of other graphic user interfaces also displayed on display screen 202. In other examples, depicted by FIG. 2B, multimedia controller 203 may be embedded in, or part of, another program, such as a web browser 204.

According to the subject technology, multimedia controller 203 is provided for user-control of multimedia from multiple compatible software and hardware multimedia sources. Integration and communication between multimedia controller 203 and compatible multimedia sources is implemented as described with respect to FIG. 1. In some implementations, multimedia controller 203 is provided for display by software of multimedia management component 107. In this manner, multimedia controller 203 provides display of detected active multimedia sources, for example, running on computing device 201, or on other devices operably connected to the computer by wired or wireless network connection. On detecting active multimedia sources, the underlying code for multimedia controller 203 or management component 106 verifies that one or more of the multimedia sources accept remote control of respective multimedia levels.

Multimedia controller 203 includes graphically displayed interactive volume controls 205, one for each detected multimedia source. Each volume control 205 remotely controls an audio level for a verified source by graphic manipulation of the volume control. Volume controls 205 may be manipulated to control volume levels by a pointing device, such as a mouse, trackball or similar device. Where display screen 202 is a touch-sensitive display, volume controls 205 may be manipulated by contact with a portion of display screen 202 at a location corresponding to the volume control 205. Additionally, multimedia controller 203 may further determine, from one or more of the detected multimedia sources, respective content information for actively playing multimedia content. Content may include, for example, the name of a song or video being played. Once detected, the content information may be displayed in a content window 206 for a corresponding multimedia source, in connection with a respective volume control 205 for the multimedia source. Multimedia controller 203 is not limited to control of volume levels. Rather, multimedia controller 203 may include other controls, including, for example, a mute control for each multimedia source, tone controls, playlist controls (forward, backward, pause, next or previous song selection), or the like.

Figure 3:
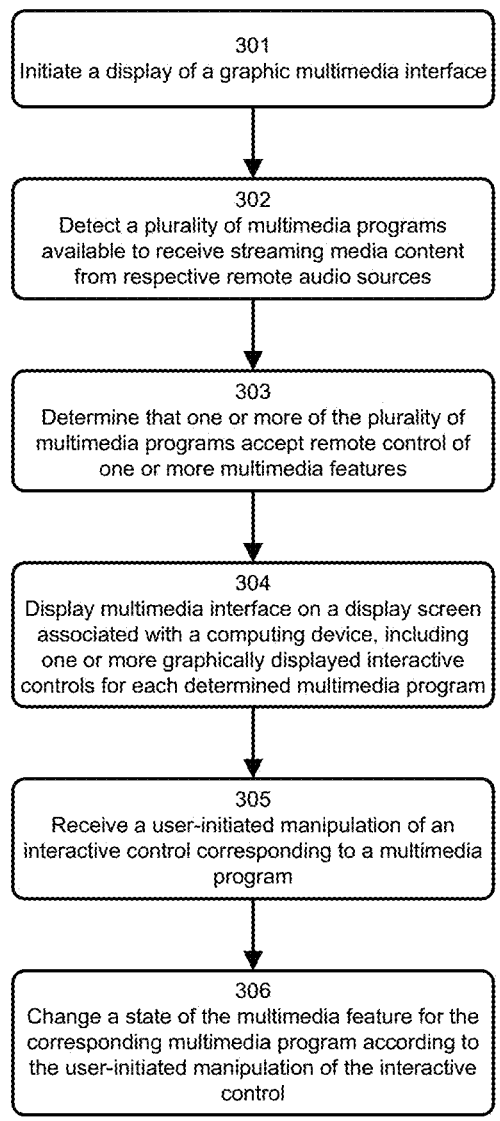
FIG. 3 is a flowchart illustrating an example process for detection and control of multimedia applications.

FIG. 3 is a flowchart illustrating an example process for detection and control of multimedia applications, according to one aspect of the subject technology. According to some aspects, the blocks of FIG. 3 may be executed by a computing device (for example, tablet computer, a desktop or notebook computer, PDA, smartphone, a television or other display device with one or more computing devices embedded therein or attached thereto, or the like). In this regard, the blocks of FIG. 3 may be performed within the context of operating a web browser provided by the computing device.

In block 301, a display of a graphic multimedia interface is initiated by a user. The multimedia interface provides a plurality of graphically displayed interactive controls for controlling multimedia features of a corresponding plurality of multimedia programs. A multimedia program may comprise a user-facing multimedia application, for example, a stand-alone media player, internet-radio application, a website providing audio content in a web browser, a website providing video content in the web browser, a browser component providing audio content, or a browser component providing video content. The interactive controls may include virtual dials, sliders, or buttons for controlling features such as a volume level, a playback of multimedia content, or a selectable list of available multimedia content.

On initiating the display of the graphic multimedia interface, in block 302, a plurality of multimedia programs available to receive streaming multimedia content from respective remote audio sources are detected by instructions associated with the multimedia interface. Detecting the multimedia programs may include, for example, receiving a plurality of registration requests from the plurality of multimedia programs at registration interface 106. In some aspects, a registration request is a request to add an active multimedia source to a list or group of registered active multimedia sources. On receiving the request, the multimedia source is registered with management component 106 (part of the multimedia subsystem 101). Accordingly, a plurality of active multimedia sources corresponding to the plurality of multimedia programs may be registered and subsequently identified in the list of registered multimedia sources.

In block 303, management component 106 determines that one or more of the plurality of multimedia programs accept remote control of one or more multimedia features. The determination may be made, for example, by virtue of being registered, or may be made by detecting one or more flags set at registration interface 107 for a multimedia program during the registration process. In block 304, the multimedia interface is displayed on a display screen associated with the computing device. The multimedia interface operates independent of the plurality of multimedia programs and includes one or more graphically displayed interactive controls for each determined multimedia program, each interactive control configured to remotely control a multimedia feature by graphic manipulation of the interactive control. In some implementations, the multimedia interface is a stand-alone graphic user interface similar to virtual multimedia controller 203 depicted in FIG. 2A. In other implementations, the multimedia interface is displayed as part of a web browser, similar to virtual multimedia controller 203 depicted in FIG. 2B.

In block 305, a user-initiated manipulation of an interactive control corresponding to a multimedia program is received, and, in block 306, a state of a multimedia feature for the corresponding multimedia program is changed according to the user-initiated manipulation of the interactive control. The state may be changed while keeping a current state of other multimedia features unchanged. In one example, manipulation of an interactive volume control triggers a command to adjust a volume level associated with a corresponding registered multimedia source. Accordingly, the volume level of audio for the registered multimedia source is adjusted while keeping volume level for other registered audio sources unchanged.

Figure 4:
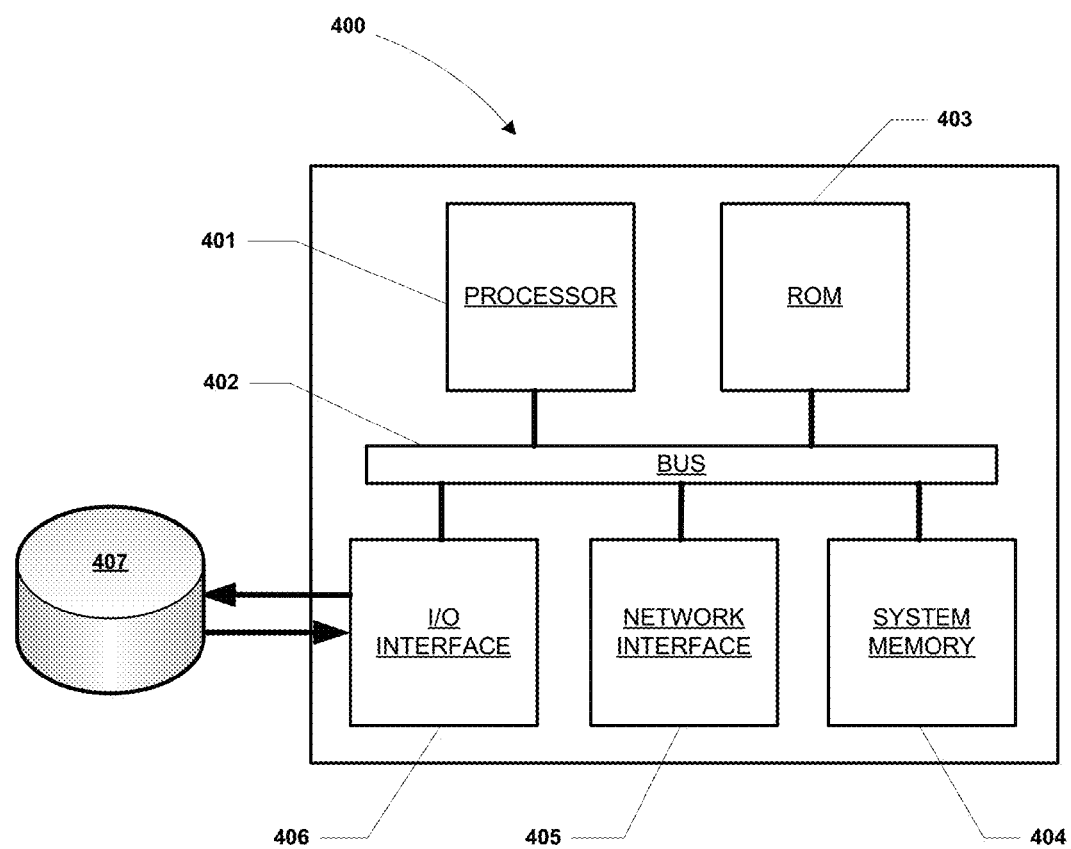
FIG. 4 is a diagram illustrating an example server system for detection and control of multimedia applications, including a processor and other internal components.

FIG. 4 is a diagram illustrating an example server system for detection and control of multimedia applications, including a processor and other internal components, according to one aspect of the subject technology. In some aspects, a computerized device 400 (for example, computing device 201) includes several internal components such as a processor 401, a system bus 402, read-only memory 403, system memory 404, network interface 405, I/O interface 406, and the like. In one aspect, processor 401 may also be communication with a storage medium 407 (for example, a hard drive, database, or data cloud) via I/O interface 406. In some aspects, all of these elements of device 400 may be integrated into a single device. In other aspects, these elements may be configured as separate components.

Processor 401 may be configured to execute code or instructions to perform the operations and functionality described herein, manage request flow and address mappings, and to perform calculations and generate commands. Processor 401 is configured to monitor and control the operation of the components in server 400. The processor may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing. One or more sequences of instructions may be stored as firmware on a ROM within processor 401. Likewise, one or more sequences of instructions may be software stored and read from system memory 405, ROM 403, or received from a storage medium 407 (for example, via I/O interface 406). ROM 403, system memory 405, and storage medium 407 represent examples of machine or computer readable media on which instructions/code may be executable by processor 401. Machine or computer readable media may generally refer to any medium or media used to provide instructions to processor 401, including both volatile media, such as dynamic memory used for system memory 404 or for buffers within processor 401, and non-volatile media, such as electronic media, optical media, and magnetic media.

In some aspects, processor 401 is configured to communicate with one or more external devices (for example, via I/O interface 406). Processor 401 is further configured to read data stored in system memory 404 and/or storage medium 407 and to transfer the read data to the one or more external devices in response to a request from the one or more external devices. The read data may include one or more web pages and/or other software presentation to be rendered on the one or more external devices. The one or more external devices may include a computing system such as a personal computer, a server, a workstation, a laptop computer, PDA, smart phone, and the like.

In some aspects, system memory 404 represents volatile memory used to temporarily store data and information used to manage device 400. According to one aspect of the subject technology, system memory 404 is random access memory (RAM) such as double data rate (DDR) RAM. Other types of RAM also may be used to implement system memory 404. Memory 404 may be implemented using a single RAM module or multiple RAM modules. While system memory 404 is depicted as being part of device 400, those skilled in the art will recognize that system memory 404 may be separate from device 400 without departing from the scope of the subject technology. Alternatively, system memory 404 may be a non-volatile memory such as a magnetic disk, flash memory, peripheral SSD, and the like.

I/O interface 406 may be configured to be coupled to one or more external devices, to receive data from the one or more external devices and to send data to the one or more external devices. I/O interface 406 may include both electrical and physical connections for operably coupling I/O interface 406 to processor 401, for example, via the bus 402. I/O interface 406 is configured to communicate data, addresses, and control signals between the internal components attached to bus 402 (for example, processor 401) and one or more external devices (for example, a hard drive). I/O interface 406 may be configured to implement a standard interface, such as Serial-Attached SCSI (SAS), Fiber Channel interface, PCI Express (PCIe), SATA, USB, and the like. I/O interface 406 may be configured to implement only one interface. Alternatively, I/O interface 406 may be configured to implement multiple interfaces, which are individually selectable using a configuration parameter selected by a user or programmed at the time of assembly. I/O interface 406 may include one or more buffers for buffering transmissions between one or more external devices and bus 402 and/or the internal devices operably attached thereto.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A non-transitory machine-readable medium having machine-executable instructions stored thereon, which when executed by a machine or computer cause the machine or computer to perform a method, comprising:
   detecting a plurality of multimedia programs that receive streaming multimedia content from an external location;
   determining that two or more of the plurality of multimedia programs accept being controlled remotely to adjust one or more multimedia features of the two or more multimedia programs, the one or more multimedia features including a playback of multimedia content; and
   providing a graphic multimedia interface for display on a computing device, including one or more graphically displayed interactive controls for each multimedia program determined to accept being controlled remotely,
   wherein the graphic multimedia interface is configured to, on a user manipulation of an interactive control, remotely control a multimedia program associated with the manipulated interactive control by sending one or more messages to the multimedia program to adjust one or more multimedia features of the multimedia program.

2. The machine-readable medium of claim 1, wherein detecting the plurality of multimedia programs comprises:
   receiving a plurality of registration requests from the plurality of multimedia programs, each registration request facilitating an addition of an active multimedia source to a list of registered active multimedia sources;
   registering a plurality of active multimedia sources corresponding to the plurality of multimedia programs; and
   identifying the plurality of active multimedia sources in the list of registered multimedia sources.

3. The machine-readable medium of claim 2, the method further comprising:
   receiving, from the multimedia interface, a command to adjust a volume level associated with a respective registered active multimedia source; and
   adjusting the volume level of audio for the respective registered active multimedia source while keeping volume level for other registered active multimedia sources unchanged.

4. The machine-readable medium of claim 1, the method further comprising:
   determining, from two or more of the detected multimedia programs, content information provided by the two or more of the detected multimedia programs; and
   providing the content information for display in connection with interactive controls associated with the two or more of the detected multimedia programs.

5. The machine-readable medium of claim 1, the method further comprising:
   receiving, at a multimedia subsystem executing on the computing device, streaming multimedia content from a detected multimedia program, the detected multimedia program receiving the streaming multimedia content from a multimedia component system located remote from the computing device.

6. The machine-readable medium of claim 5, the method further comprising:
   receiving, from the multimedia interface, one or more commands to control one or more features of the multimedia component system; and
   on receiving the one or more commands, remotely controlling, via the detected multimedia program, the one or more features of the multimedia component system according to the received one or more commands.

7. The machine-readable medium of claim 1, the method further comprising:
   receiving, at a multimedia subsystem executing on the computing device, streaming multimedia content from a detected multimedia program, the detected multimedia program being a user-facing multimedia application executing independent of the multimedia subsystem.

8. The machine-readable medium of claim 7, wherein the user-facing multimedia application is one of a stand-alone media player, internet-radio application, a website providing audio content in a web browser, a website providing video content in the web browser, a browser component providing audio content, and a browser component providing video content.

9. The machine-readable medium of claim 1, wherein the plurality of multimedia programs comprise one or more native applications and one or more web applications.

10. The machine-readable medium of claim 1, wherein the two or more of the plurality of multimedia programs are determined to accept remote control of one or more multimedia features by querying an interface provided by an application programming interface (API) framework.

11. The machine-readable medium of claim 1, wherein the one or more interactive controls include a volume control, the multimedia interface being configured to remotely control a volume level associated with streaming multimedia content provided by a multimedia program by graphic manipulation of the volume control.

12. The machine-readable medium of claim 1, wherein the one or more multimedia features comprise one of a volume level, a playback of multimedia content, and a selectable list of available multimedia content.

13. A computer-implemented method, comprising:
   initiating, at a computing device, a display of a graphic multimedia interface;
   determining, on initiating the display of the multimedia interface, a plurality of multimedia programs available to receive streaming multimedia content from respective remote audio sources; and
   providing the multimedia interface for display on a display screen associated with the computing device, the multimedia interface operating independent of the plurality of multimedia programs,
   wherein the multimedia interface includes a plurality of graphically displayed interactive controls for remotely controlling the plurality of multimedia programs and to control one or more multimedia features of the plurality of multimedia programs by providing one or more messages to the plurality of multimedia programs, the one or more multimedia features including a playback of multimedia content.

14. The computer-implemented method of claim 13, wherein determining the plurality of multimedia programs comprises:

receiving a plurality of registration requests from the plurality of multimedia programs, a registration request for adding an active multimedia source to a group of registered active multimedia sources;

registering a plurality of active multimedia sources corresponding to the plurality of multimedia programs; and identifying the plurality of active multimedia sources from the group of registered active multimedia sources.

15. The computer-implemented method of claim 13, further comprising:

receiving a user-initiated manipulation of an interactive control corresponding to a multimedia program; and changing a state of a multimedia feature for the corresponding multimedia program according to the manipulation of the interactive control while keeping a current state of other multimedia features for other multimedia programs unchanged.

16. The computer-implemented method of claim 15, wherein the interactive control is a volume control, the multimedia interface being configured to remotely control a volume level associated with streaming multimedia content by graphic manipulation of the volume control.

17. The computer-implemented method of claim 13, further comprising:

determining content information for an audio source corresponding to one of the plurality of multimedia programs; and providing the content information for display in connection with an interactive control for a multimedia program associated with the audio source.

18. The computer-implemented method of claim 17, wherein the content information is a title or description associated with audio data received from the audio source.

19. The computer-implemented method of claim 13, the method further comprising:

receiving, at a multimedia subsystem executing on the computing device, streaming multimedia content from a multimedia program, the multimedia program receiving the multimedia data from a multimedia component system located remote from the computing device.

20. The computer-implemented method of claim 13, the method further comprising:

receiving, at a multimedia subsystem executing on the computing device, streaming multimedia content from a multimedia program, the multimedia program being a user-facing multimedia application executing independent of the multimedia subsystem.

21. The computer-implemented method of claim 20, wherein the user-facing multimedia application is one of a stand-alone media player, internet-radio application, a website providing audio content in a web browser, a website providing video content in the web browser, a browser component providing audio content, and a browser component providing video content.

22. The computer-implemented method of claim 13, wherein the plurality of multimedia programs comprise one or more native applications and one or more web applications.

23. The computer-implemented method of claim 13, wherein the one or more of the plurality of multimedia programs are determined to accept remote control of one or more multimedia features by querying an interface provided by an application programming interface (API) framework.

24. A system, comprising:

a display screen;

a processor; and a memory including instructions that, when executed by the processor, causes the processor to:

initiate a display of a graphic multimedia interface;

determine, on initiating the display, a plurality of multimedia programs available to receive streaming multimedia content from respective remote audio sources, the multimedia programs comprising one or more native applications and one or more web applications;

provide the multimedia interface for display on the display screen, the multimedia interface operating independent of the plurality of multimedia programs and including one or more graphically displayed interactive controls for each of the determined plurality of multimedia programs, each interactive control configured to remotely control one of the determined plurality of multimedia programs by graphic manipulation of the interactive control to adjust one or more multimedia features, the one or more multimedia features including a playback of multimedia content;

receive a user-initiated manipulation of an interactive control corresponding to a multimedia program; and change a state of a multimedia feature for the corresponding multimedia program according to the user-initiated manipulation of the interactive control while keeping a current state of other multimedia features for other multimedia programs unchanged.

* * * * *